United States Patent [19]
Hopkins et al.

[11] Patent Number: 5,847,909
[45] Date of Patent: Dec. 8, 1998

[54] SAFETY-ENHANCED TRANSFORMER CIRCUIT

[75] Inventors: William Thomas Hopkins; Alan M. Smith, both of Dickson, Tenn.

[73] Assignee: France/Scott Fetzer Company, West Fairview, Tenn.

[21] Appl. No.: 838,060

[22] Filed: Apr. 17, 1997

[51] Int. Cl.$^6$ .................................................. H02H 7/04
[52] U.S. Cl. .............................................. 361/35; 361/42
[58] Field of Search .................................. 361/35, 38, 42, 361/49, 54, 55, 56, 57, 87, 93; 340/646, 649, 650, 651; 324/521, 522, 524, 547; 315/DIG. 7, 118, 127, 135, 225; 363/50

[56] References Cited

U.S. PATENT DOCUMENTS

| | | | |
|---|---|---|---|
| 4,016,489 | 4/1977 | Adams et al. | 324/51 |
| 4,507,698 | 3/1985 | Nilssen | 361/42 |
| 4,563,719 | 1/1986 | Nilssen | 361/45 |
| 4,613,934 | 9/1986 | Pacholok | 363/131 |
| 4,663,571 | 5/1987 | Nilssen | 315/244 |
| 4,675,576 | 6/1987 | Nilssen | 315/242 |
| 4,855,860 | 8/1989 | Nilssen | 361/45 |
| 4,939,427 | 7/1990 | Nilssen | 315/209 R |
| 5,049,787 | 9/1991 | Nilssen | 315/209 R |
| 5,089,752 | 2/1992 | Pacholok | 315/307 |
| 5,241,443 | 8/1993 | Efantis | 361/36 |
| 5,349,273 | 9/1994 | Pacholok | 315/307 |
| 5,457,360 | 10/1995 | Notohamiprodjo et al. | 315/219 |
| 5,550,437 | 8/1996 | Hopkins et al. | 315/209 R |

FOREIGN PATENT DOCUMENTS 0 615 402A2  4/1994  European Pat. Off.  ........ H05B 41/29

OTHER PUBLICATIONS

Efantis, Tony, *Ground–Fault Protection on Neon Secondaries*, Signs of the Times, Jul. 1996, pp. 130–133, 188.

*Primary Examiner*—Ronald W. Leja
*Attorney, Agent, or Firm*—Wood, Herron & Evans, L.L.P.

[57] ABSTRACT

A transformer control circuit which includes a ground fault detection circuit that detects ground fault currents in the transformer secondary and delivers a ground fault detection signal to the primary circuit. This circuit derives power from the secondary winding and transmits the ground fault detection signal through an optical isolation barrier, thus avoiding the use of an auxiliary transformer. The ground fault detection circuit further includes safety features for detecting whether AC power is being supplied without earth ground being connected, and/or whether there is an undesired electrical connection between a transformer output connection and earth ground, which would defeat the ground fault detection circuit.

16 Claims, 4 Drawing Sheets

SAFETY-ENHANCED TRANSFORMER CIRCUIT

FIELD OF THE INVENTION

The present invention relates to transformers for neon signs and the like.

BACKGROUND OF THE INVENTION

A gas discharge tube lamp typically requires a transformer to control current being delivered to the lamp. The transformer converts the AC line voltage available from the wall outlet to a substantially larger magnitude AC voltage suitable for igniting and maintaining a discharge in the tube lamp. The transformer further isolates the AC voltage driving the lamp from the remainder of the AC wiring and any control circuitry controlling the transformer.

A neon sign (hereinafter also called "neon tubing"), is one example of a gas discharge lamp. Neon signs typically use a transformer (hereinafter called a "neon transformer") to illuminate the sign. The following discussion of the background and the invention will refer to transformer circuits used for neon signs, however, it will be understood that principles of the present invention have application to other gas discharge tube lamps as well.

One concern raised by the high voltages required to drive neon tubing, is the potential that fault currents may flow from the high voltage source to earth ground from any of a number of locations, potentially igniting fires when the ground fault creates an arc which involves flammable materials. Although some neon transformer circuits do not include ground fault detector circuits, at least one neon transformer circuit having such a circuit has been introduced. This ground fault detector circuit identifies fault currents flowing to ground from the secondary winding of the transformer, or from any part of the neon sign, to ground. If such current is detected, primary power is removed from the transformer.

To detect ground fault current, it is typically necessary to couple a ground fault detection circuit to the secondary winding of the main transformer, and/or to the neon sign itself. Specifically, the ground fault detection circuit may be coupled between an earth ground terminal, and either a center tap of the secondary winding of the main transformer, and/or a return point located near the electrical mid-point of the neon tubing.

Because the ground fault detection circuit is directly connected between ground and the secondary, it must be isolated from the primary side of the main transformer. Accordingly, it is typically necessary to include an auxiliary transformer in the ground fault circuit, to deliver isolated power from the AC source to the ground fault circuit, and/or to transmit an isolated ground fault detection signal to the primary side of the main transformer for the purpose of removing primary power. Unfortunately, particularly where the auxiliary transformer operates at the 60 Hz line frequency, the auxiliary transformer can become prohibitively large and expensive.

A ground fault detection circuit, which does not require an auxiliary transformer, is shown by Pacholok, U.S. Pat. No. 5,089,752. In this patent, the transformer core is used as an isolated, "capacitive center tap" to the secondary winding of the main transformer. The theory behind this circuit, is that a ground fault current flowing, for example, into the center tap of the secondary, and out through one of the windings, will create an imbalance between the currents and voltages in the secondary windings on either side of the center tap, which will be manifested as an AC signal at the "capacitive center tap". An AC signal at the "capacitive center tap" thus indicates a ground fault, and can be detected by circuitry on the primary side of the main transformer.

Unfortunately, the Pacholok circuit requires careful balancing of the parasitic capacitances in the secondary winding, and due to variations in these capacitances, and their relatively small values, the Pacholok circuit can be too susceptible to noise and manufacturing variation to detect low-level ground fault currents.

Accordingly, there remains a need for a high sensitivity ground fault circuit for a neon sign (or other gas discharge lamps) control circuit, which can operate in isolation from the primary winding of the main transformer, without requiring the use of an auxiliary transformer.

Another limitation of known ground fault detection circuits, is the likelihood that they may defeated. Often, the ground fault detection circuit can be defeated by simply disconnecting earth ground from the control circuit, because doing so will prevent any part of the ground fault current from flowing back to the transformer and on to earth ground, thus preventing detection of such currents by the detection circuit. Often the ground fault detection will also be defeated if the connections of the AC neutral and line terminals are reversed. Since it is likely that the earth ground lead will be inadvertently or deliberately left disconnected, and/or that the neutral and line terminals will be reversed, these opportunities to defeat the ground fault circuit represent a serious shortcoming in many existing ground fault circuits.

It is also possible to defeat many ground fault detection circuits by inadvertently or deliberately shorting out the ground fault detection circuit; specifically, if the secondary center tap, or return terminal, is connected directly to earth ground, this will short out some types of detection circuits, so that ground fault current will pass directly to earth ground rather than through the ground fault detection circuit. This will prevent detection of such ground fault currents by the ground fault detection circuit. Because neon sign installers are familiar with connecting the secondary center tap and/or return terminal directly to earth ground, it is likely that such a connection will be made inadvertently, defeating the ground fault detection circuit. Accordingly, this is another serious shortcoming of many existing ground fault detection circuits.

Thus, there is a need for a ground fault detection circuit which cannot be defeated by failure to connect the ground lead to the circuit, reversing of the neutral and line terminals, and/or by direct connection of the secondary center tap and/or return terminal to earth ground.

SUMMARY OF THE INVENTION

In accordance with principles of the present invention, these needs are met by an inventive transformer control circuit having a ground fault detection circuit that detects ground fault currents in the transformer secondary and delivers a ground fault detection signal to the primary circuit, which is tripped whenever AC power is supplied without earth ground being connected, whenever the line and neutral terminals are reversed, or whenever there is a short between earth ground and the center tap of the transformer secondary. Furthermore, this ground fault detection circuit achieves these functions without use of an auxiliary transformer.

Specifically, in one aspect, the invention features a tamper protected circuit for connection to a primary winding of a transformer, for detecting whether a ground terminal has been connected to earth ground. Power application circuitry connects the line and neutral terminals leading to a source of AC power, to the terminals of a primary winding of a transformer. To detect whether a ground connection has been made, the circuit includes an electrical impedance, connected between the line terminal and the ground terminal, and a second electrical impedance connected between the ground terminal and the neutral terminal leading to the source of AC power. If a ground connection has been made, substantially no current should flow through the second electrical impedance between the neutral terminal and the ground terminal of the circuit. Accordingly, ground detection circuitry is electrically coupled to the second electrical impedance, and generates a shutoff signal upon detection of more than a predetermined current flow through the second electrical impedance, causing the power application circuitry to reduce electrical power applied to the primary winding.

In a further aspect, the invention features a tamper protected circuit which detects whether there is an electrical short between the return terminal and earth ground. The circuit includes rectification circuitry connected between the secondary windings, so that current flow through the secondary windings also passes through the rectification circuitry. The rectification circuitry rectifies a portion of this current, to supply operating power to detection circuits on the secondary side of the transformer. An electrical impedance is connected between the ground terminal and the return terminal. This impedance includes a rectifier with a small forward voltage. Normally, if the ground and return terminal are not shorted together, current will not flow through the impedance, due to the forward voltage required to pass current through the rectifier. However, if there is a short between the ground and return terminals, current will flow through the short. Accordingly, a tamper detection circuit detects current flowing between the ground and return terminals, and generates a shutoff signal upon detection of more than a predetermined threshold current. A power application circuit responds to this shutoff signal by reducing the power applied to the primary winding of the transformer.

In other embodiments of this aspect, the rectification circuitry might force a current through the impedance, rather than apply a voltage across the impedance. In this embodiment, the tamper protection circuit would detect the voltage appearing across the impedance, and generate a shutoff signal upon detection of less than a predetermined threshold voltage.

In a related aspect, the invention features a circuit collecting electrical energy from current flowing between two secondary windings, to be used for any purpose. Specifically, the circuit includes first and second start terminals, which are connected in series between two transformer secondary windings. Currents flowing between the start terminals are directed through a capacitor, so that the capacitor accumulates electrical energy in the form of stored electric charge. To direct current into the capacitor, a first rectifier is connected between the first start terminal and a first terminal of the capacitor, to permit only forward current flow from the first start terminal to the first terminal of the capacitor, and a second rectifier is connected between the second start terminal and the first capacitor terminal to permit only forward current flow from the second start terminal to the first terminal of the capacitor. Also, a first zener rectifier is connected between the first start terminal and a second terminal of the capacitor to permit forward current flow from the second terminal of the capacitor to the first start terminal, and to permit reverse current flow from the first start terminal to the second terminal of the capacitor only when a predetermined voltage appears across the capacitor, and a second zener rectifier is connected between the second start terminal and the second terminal of the capacitor to permit forward current flow from the second terminal of the capacitor to the second start terminal, and to permit reverse current flow from the second start terminal to the second terminal of the capacitor only when a predetermined voltage appears across the capacitor.

The above and other aspects, objectives and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
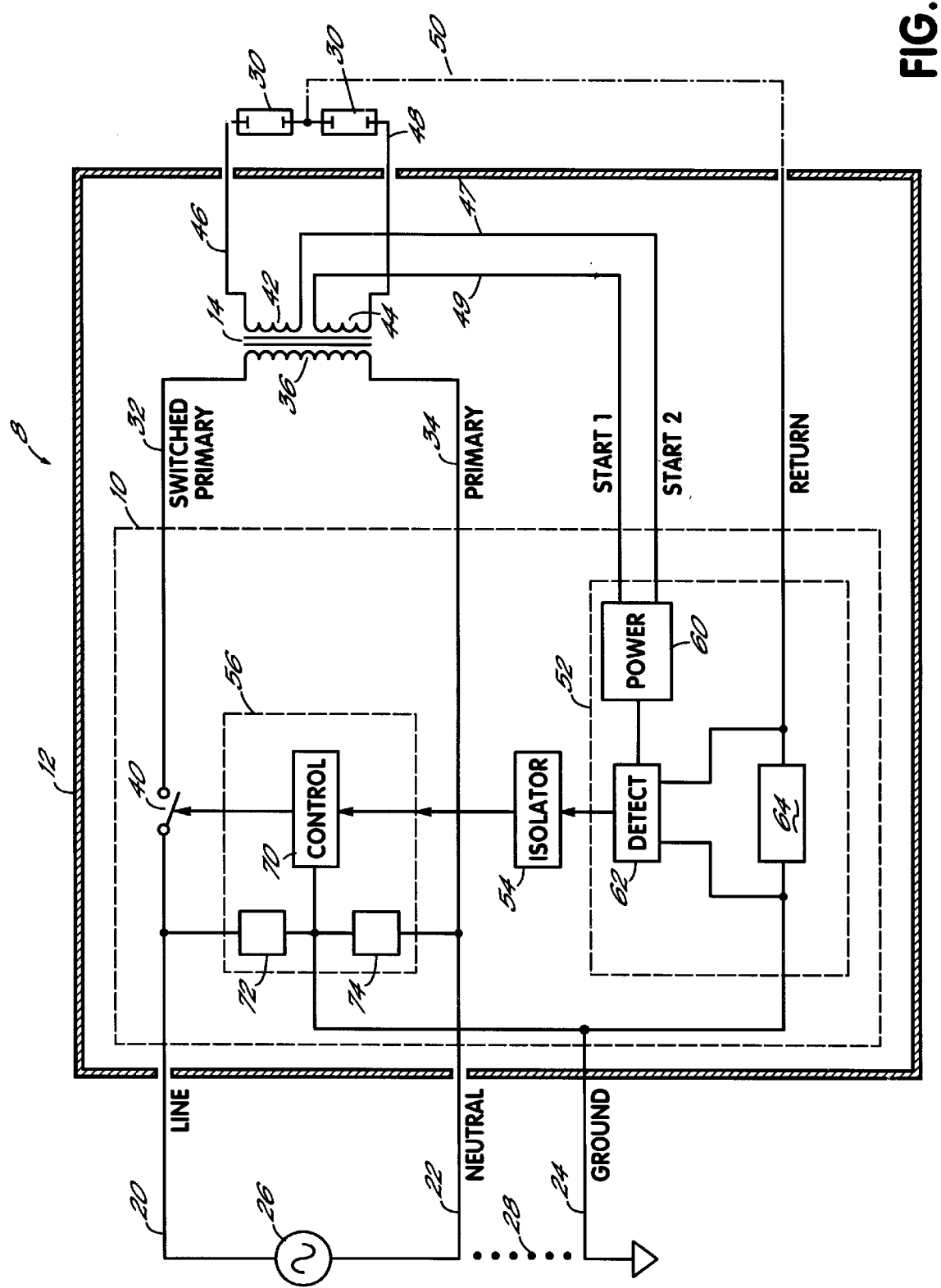
FIG. 1 is a functional block diagram of a transformer circuit in accordance with principles of the present invention, including circuitry for detecting ground fault current, circuitry for detecting whether a ground connection has been made, and circuitry for detecting whether the return terminal has been shorted to the ground terminal.

Referring to FIG. 1, the structure of a transformer circuit 8 can be explained. The transformer circuit is contained within an enclosure 12, which may be of a conductive material such as metal, or may be of nonconductive material such as plastic. Enclosure 12 shields the circuitry within enclosure 12 and reduces the potential for electric shock of the installer or user of the transformer circuit 8.

The circuitry inside of enclosure 12 includes a control circuit 10 (identified in dotted lines), and a transformer 14. Alternating current (AC) power is received by control circuit 10 and delivered from control circuit 10 to primary winding of a transformer 14.

The inputs to control circuit 10 are a 120 V 60 Hz AC line signal on line terminal 20 and neutral terminal 22, and a ground terminal 24. As is conventional in residential wiring, utility power is applied by an AC power source 26 between neutral terminal 22 and line terminal 20. Ground terminal 24 is connected to earth ground, for example at the power panel where AC is distributed to the building. Typically, at this same location, neutral terminal 22 is also connected to earth ground as indicated by connection 28.

Control circuit 10 provides alternating current power to the primary winding 36 of transformer 14, which is connected between leads 32 and 34. In the illustrated embodiment, a pair of relay contacts forming a switch 40 within control circuit 10, is used to apply AC power from terminal 20 to transformer winding 36 via primary lead 32, and primary lead 34 is at all times connected to neutral terminal 22. In alternative embodiments, a solid state switch such as a silicon controlled rectifier (SCR) might be used as switch 40. Also, while in the illustrated embodiment, switch 40 is connected in series between line terminal 20 and primary lead 34, in alternative embodiments, switch 40 might be connected in series between neutral terminal 22 and primary lead 32, with line terminal 20 permanently connected to primary lead 34.

Transformer 14 transforms the alternating current signals applied to primary winding 36 into corresponding alternating current signals at secondary windings 42 and 44. Typically, the turns ratio of transformer 14 is such that a substantially higher voltage signal is produced by secondary windings 42 and 44 than is delivered to primary winding 36, to ignite a discharge lamp 30 (hereinafter, referred to as a neon sign, although other loads could be powered with the disclosed circuitry).

A first terminal 46 of winding 42 and a second terminal 48 of winding 44 are connected to opposite ends of neon sign 30 to provide power to illuminate the sign. The second terminal 47 of winding 42 and first terminal 49 of winding 44 are connected to start 1 and start 2 inputs of a power rectifier 60. Using current flowing between these inputs, power rectifier 60 derives electrical power to energize a tamper detect circuit 52 within circuit 10, as discussed below.

A central point in neon sign 30 may be optionally connected via a line 50, to a return connection of circuit 10. A connection of this sort is used in some applications to reduced electrical stresses. As noted above, when a return connection of this sort is used, there is a risk that the return connection will be shorted to ground. Accordingly, as discussed below, circuit 10 detects whether the return connection has been shorted to ground.

Specifically, circuit 10 includes a ground fault and tamper detect circuit 52, connected to the safety ground terminal 24 and to the start and return terminals 47, 49 and 50 which lead to secondary windings 42 and 44 and neon sign 30. Within circuit 52 is a power rectifier 60 which is connected between the start terminals 47 and 49, and rectifies at least a portion of the AC current flowing through between terminals 47 and 49 to provide direct current (DC) power to operate circuit 52. Circuit 52 further includes a detect circuit 62, providing ground fault detection and tamper detection functions. Specifically, circuit 62 interacts with an electrical impedance 64, such as a diode, to detect ground fault currents and to monitor for tampering.

Using power derived from secondary current by power rectifier 60, detect circuit 62 applies a small voltage across impedance 64 and monitors the current through impedance 64. Impedance 64 includes a rectifier which should not permit current flow through impedance 64 when this small voltage is applied. Therefore, if no current flows through impedance 64, this indicates that the return terminal 50 is not electrically connected to safety ground terminal 24. However, if the installer has intentionally or inadvertently connected return terminal 50 directly to earth ground, current will flow around impedance 64, and be detected by detect circuit 62. In such a circumstance, detect circuit 62 generates a SHUT OFF signal to isolator 54. Isolator 54 forwards the SHUT OFF signal to control and ground sense circuit 56 which then instructs switch 40 to open, disconnecting power from transformer 14, as described below. Thus, if an installer intentionally or inadvertently shorts the return terminal 50 from neon sign 30 to earth ground, circuit 10 will respond by disconnecting electric power from transformer 14.

Detect circuit 62 also interacts with impedance 64 to perform a ground fault current detection function. Specifically, if there is a substantial ground fault current leaking to ground from neon sign 30, or from one of the secondary windings 42 or 44, a fault current from ground will flow through ground terminal 24 and through impedance 64, and then through rectifier 60 and terminals 47 or 49 to the sign. This fault current will generate a substantial voltage across impedance 64, which can be detected by detect circuit 62. In such a circumstance, detect circuit 62 will generate a SHUT OFF signal to isolator 54. Isolator 54 will then forward a SHUT OFF signal to control and ground sense circuit 56 which will instruct switch 40 to open, disconnecting electric power from transformer 14, as described below.

Thus, ground fault and tamper detect circuit 52 performs the dual functions of insuring that the return terminal 50 has not been shorted to earth ground, and detecting ground fault current flowing to or from earth ground.

As noted above, control and ground sense circuit 56 is responsive to the SHUT OFF signal from isolator 54 to control switch 40 to open and disconnect power to transformer 14.

Specifically, control and ground sense circuit 56 includes a control circuit 70 for controlling switch 40. Control and ground sense circuit 56 further includes an impedance 72 connected between line terminal 20 and safety ground terminal 24, and a second impedance 74 connected between safety ground terminal 24 and neutral terminal 22. These impedances are used to detect whether an earth ground connection has been made to circuit 10, and to confirm that the line and neutral inputs have not been reversed.

Specifically, when AC power from source 26 is applied to line and neutral terminals 20 and 22, a current will flow through impedance 72 between line terminal 20 and safety ground terminal 24. If an earth ground connection has been made to circuit 10, this current will be diverted through the safety ground terminal 24, and through connection 28 (made within the power panel at which AC power is distributed to the building), to return to the AC source 26, and little or no current will flow through impedance 74. However, if no ground connection has been made, then current flowing through impedance 72 from line terminal 20 will flow through impedance 74 into neutral terminal 22, and thus return to source 26. In such a situation, a voltage will develop across impedance 74, which voltage can be detected by control circuit 70. If a substantial voltage is detected across impedance 74 by control circuit 70, control circuit 70 will instruct switch 40 to open, disconnecting power from transformer 14. Thus, an installer must make a ground connection to circuit 10 for circuit 10 to be operable.

A similar result will occur if the line and neutral connections are reversed. If the AC line voltage is connected to the neutral input of circuit 10, and the AC neutral is connected to the line input of circuit 10, current will flow from the AC line, through impedance 74, to either the safety ground terminal 24 (if connected) or to the AC neutral through impedance 72. This will cause a voltage to develop across impedance 74, causing control circuit 70 to instruct switch 40 to open, disconnecting power from transformer 14. Thus, an installer must properly connect the line and neutral terminals to circuit 10 for circuit 10 to be operable.

Figure 2:
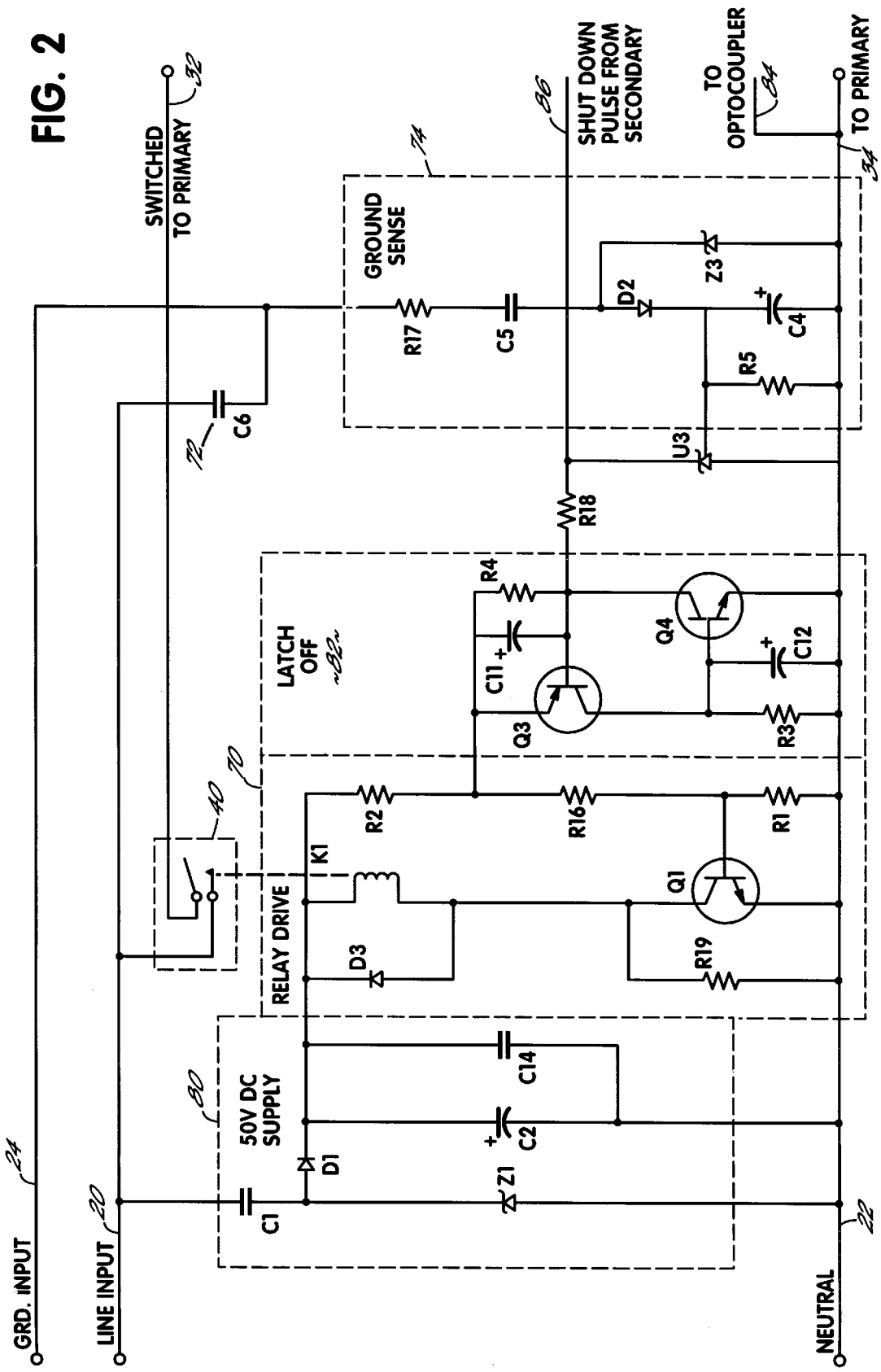
FIG. 2 is a circuit diagram of the primary control and ground sense portion of the circuit of FIG. 1, illustrating the circuitry for detecting whether a ground connection has been made and for interrupting power to the transformer in response to fault conditions.

Referring now to FIG. 2, a specific circuit implementation of control and ground sense circuit 56 and other features of the primary side circuitry can be discussed. To supply power to the control circuitry shown in FIG. 2, a bias supply circuit 80 derives a fifty Volt supply voltage from the line terminal 20 and neutral terminal 22. Specifically, a capacitor C1 and zener diode Z1 are series connected between line input 20 and neutral input 22. The cathode of zener diode Z1 is connected to capacitor C1, and the anode of zener diode Z1 is connected to neutral terminal 22. The cathode of zener diode Z1 is also connected to an anode of a rectifier D1. The cathode of rectifier D1 is connected to a pair of capacitors C2 and C14. The opposite terminals of C2 and C14 are connected the neutral terminal 22.

During the positive half cycle of the AC line on terminal 20, current flows through capacitor C1 and through rectifier D1 and charges capacitor C2 and capacitor C14. This process continues until capacitor C2 and capacitor C14 reach a voltage of approximately fifty Volts, at which time, zener diode Z1 breaks over and further current flow into capacitor C1 from line terminal 20 flows through zener diode Z1 (cathode to anode) and into neutral terminal 22. During the negative half of the line cycle, current flows from the neutral terminal 22 through zener diode Z1 (anode to cathode) and then through C1, reversing the charge accumulated on capacitor C1 during the positive half cycle. Thus, capacitor C2 and C14 charge to a regulated fifty Volt DC voltage relative to neutral input terminal 22. This fifty Volt DC power supply is used to drive the remaining circuitry of FIG. 2. (It will be noted that capacitor C1 must withstand substantially the entire line voltage between line input 20 and neutral input 22, and must be rated for such voltage levels.)

The power supply voltage derived by the above-described circuitry, is used to drive a relay contact 40, which applies power from input line terminal 20 to output switched primary lead 32. Relay contact 40 is driven by a relay winding K1. When current flows through relay winding K1, relay contact 40 is drawn to a closed position, but when current is removed from relay winding K1, relay contact 40 opens, disconnecting power from switched primary terminal 22. When power is first applied to the circuitry of FIG. 2, relay contact 40 is in its open position. As capacitor C2 and C14 are charged from the AC line terminal, current begins to flow through resistors R2, R16 and R1. When a sufficient current is flowing through resistor R1, transistor Q1 is switched to an on condition, thus drawing current through relay winding K1 and pulling relay contact 40 to a closed position. Current will continue to flow through relay winding K1 holding relay contact 40 closed, so long as transistor Q1 remains turned on by current flow through resistor R1. As will be noted below, transistor Q1 may be shut off under various fault conditions, in which case, current is removed from relay winding K1 and relay contact 40 will open, disconnecting power from switched primary lead 32.

A diode D3 is connected in shunt across relay winding K1 to provide a path for any inductively generated currents produced by relay winding K1 when transistor Q1 is switched off. Further, a second resistor R19 is connected across transistor Q1 to discharge capacitors C2 and C14 (through relay winding K1) when AC power is removed.

Transistor Q1 is turned off by a latch circuit 82 connected to the node between resistors R2 and R16, and to neutral terminal 22. Latch circuit 82 comprises a pair of regeneratively connected transistors, specifically, a PNP transistor Q3 and an NPN transistor Q4. The base of transistor Q3 is connected to the collector of transistor Q4, and the collector of transistor of Q3 is connected to the base of transistor Q4. The emitter of transistor Q3 is coupled to the node between resistors R2 and R16, and the emitter of transistor Q4 is coupled to neutral terminal 22. A resistor and capacitor pair is connected between the emitter and base of each of transistors Q3 and Q4.

As a result of the connections, when power is first applied by DC supply 80, and current begins to flow thought resistors R2, R16 and R1. The emitter of transistor Q3 is elevated to a positive DC voltage relative to neutral terminal 22. Because capacitor C11 is not charged at this time, transistor Q3 remains turned off. Because transistor Q3 is turned off, no current is able to flow into the base of transistor Q4 and/or capacitor C12 and resistor R3. As a result, transistor Q4 remains turned off. Thus, essentially no current flows through latch circuit 82 when power is initially applied, and latch circuit 82 will remain in this condition until it is turned to an on condition by circuitry to be discussed below.

Specifically, resistor R18 is connected between the base of transistor Q3 and the cathode of a shunt regulator U3. The anode of shunt regulator U3 is connected to neutral terminal 22. The control terminal of shunt regulator U3 is connected to a circuit forming the ground sense impedance 74. Impedance 74 is connected between the safety ground input terminal 24 of circuit 10 (see FIG. 1) and the neutral terminal 22. As discussed above, a second impedance 72 is connected between the line input terminal 20 and the safety ground terminal 24 of circuit 10 (see FIG. 1). If an earth ground connection has been made to safety ground input terminal 24, current will flow through impedance 72 (capacitor C6) between line input terminal 20 and safety ground terminal through circuit 10 (see FIG. 1). Substantially no current will flow through impedance 74 so long as an earth ground connection has been made to the safety ground terminal 24, because the neutral input terminal 22 is connected to earth ground 24 at a remote location, thus short-circuiting impedance 74. However, if safety ground terminal 24 is not connected to earth ground, current flowing through impedance 72 will flow through impedance 74 between neutral terminal 22 and line terminal 20. This current is detected and used to activate shunt regulator U3 and turn latch circuit 83 on. Moreover, as noted above, if the line and neutral connections to the AC power line are reversed, this will also generate a current through impedance 74, which will be detected and used to activate shunt regulator U3 and turn latch circuit 83 on.

Impedance 74 comprises a series connected resistor R17 and capacitor C5 coupled through a rectifier D2 to a parallel connected capacitor C4 and resistor R5, and to the control input of shunt regulator U3.

If safety ground terminal 24 is not connected to earth ground, during the positive half of the line cycle applied to terminal 20, current will flow through impedance 74 from safety ground terminal 24 to neutral terminal 22, charging capacitors C6, C5 and C4. During the negative half cycle, the charge on capacitors C6 and C5 is reversed, but rectifier D2 prevents capacitor C4 from discharging. Accordingly, charge accumulates on capacitor C4, ultimately accumulating a voltage across capacitor C4 sufficient to activate shunt regulator U3 and cause shunt regulator U3 to draw current between its cathode and anode through resistor R18. (Charging of capacitor C4 is limited by zener diode Z3, which shunts current around rectifier D2, resistor R5 and capacitor C4 once a predetermined voltage has accumulated on capacitor C4.)

Similarly, if the line and neutral connections are reversed, during the negative half of the line cycle applied to terminal 20, current will flow through impedance 74 from safety ground terminal 24 to neutral terminal 22, charging capacitors C6, C5 and C4. During the positive half cycle, the charge on capacitors C6 and C5 is reversed, but rectifier D2 prevents capacitor C4 from discharging. Thus, again charge accumulates on capacitor C4, ultimately accumulating a voltage across capacitor C4 sufficient to activate shunt regulator U3.

When shunt regulator U3 has been turned on in this way, current is drawn through resistor R2, capacitor C11, and into resistor R18 and to neutral terminal 22. As current begins to flow in this path, capacitor C11 charges and develops a voltage drop, until the voltage across capacitor C11 is sufficient to turn transistor Q3 on. Once transistor Q3 has been turned on by a sufficient emitter to base voltage across capacitor C11, transistor Q3 begins to draw current from its emitter to its collector, and deliver this current to capacitor C12. Capacitor C12 then begins to accumulate charge and develop a voltage drop across the base-emitter junction of transistor Q4. Ultimately, a sufficient voltage accumulates on capacitor C12 to turn transistor Q4 on. Once transistor Q4 is turned on, transistor Q4 will draw current from its collector to its emitter through resistor R4 and through the emitter-base junction of the transistor Q3. Thus, transistor Q4 will hold transistor Q3 on regardless of whether current continues to flow through resistor R18, and at the same time, transistor Q3 will continue to conduct electric current into the base of transistor Q4 to hold transistor Q4 on. Thus, transistors Q3 and Q4 will regeneratively hold each other in an on condition, drawing current from resistor R2 into the emitter of transistor Q3. Transistors Q3 and Q4 will remain turned on until power is removed from the line and neutral terminals 20 of the circuit 10 and capacitors C2 and C14 discharge through resistors R19 and the series combination of resistors R2, R16 and R1.

Once transistors Q3 and Q4 of the latch circuit 82 have been turned on in this way, latch circuit 82 will divert substantially all of the current flowing through resistor R2 into the emitter of transistor Q3. Very little current will remain to flow through resistors R16 and resistor R1. As a result, the voltage drop across resistor R1 will be become insufficient to maintain transistor Q1 turned on. Transistor Q1 will then turn off, discontinuing the flow of current through relay winding K1. This will cause relay contact 40 to open, disconnecting power from switched primary lead 32 of the transformer 14.

Thus, when any substantial current is detected flowing through impedance 74, this current will cause shunt regulator U3 to turn on and activate latch circuit 82, thus turning off transistor Q1 and opening relay contact 40 to disconnect power to the transformer 14. Therefore, an installer must make a ground connection to the circuit, and must correctly connect the line and neutral terminals, in order for the circuit to operate and supply power to the transformer 14 and sign 30 (FIG. 1).

Figure 3:
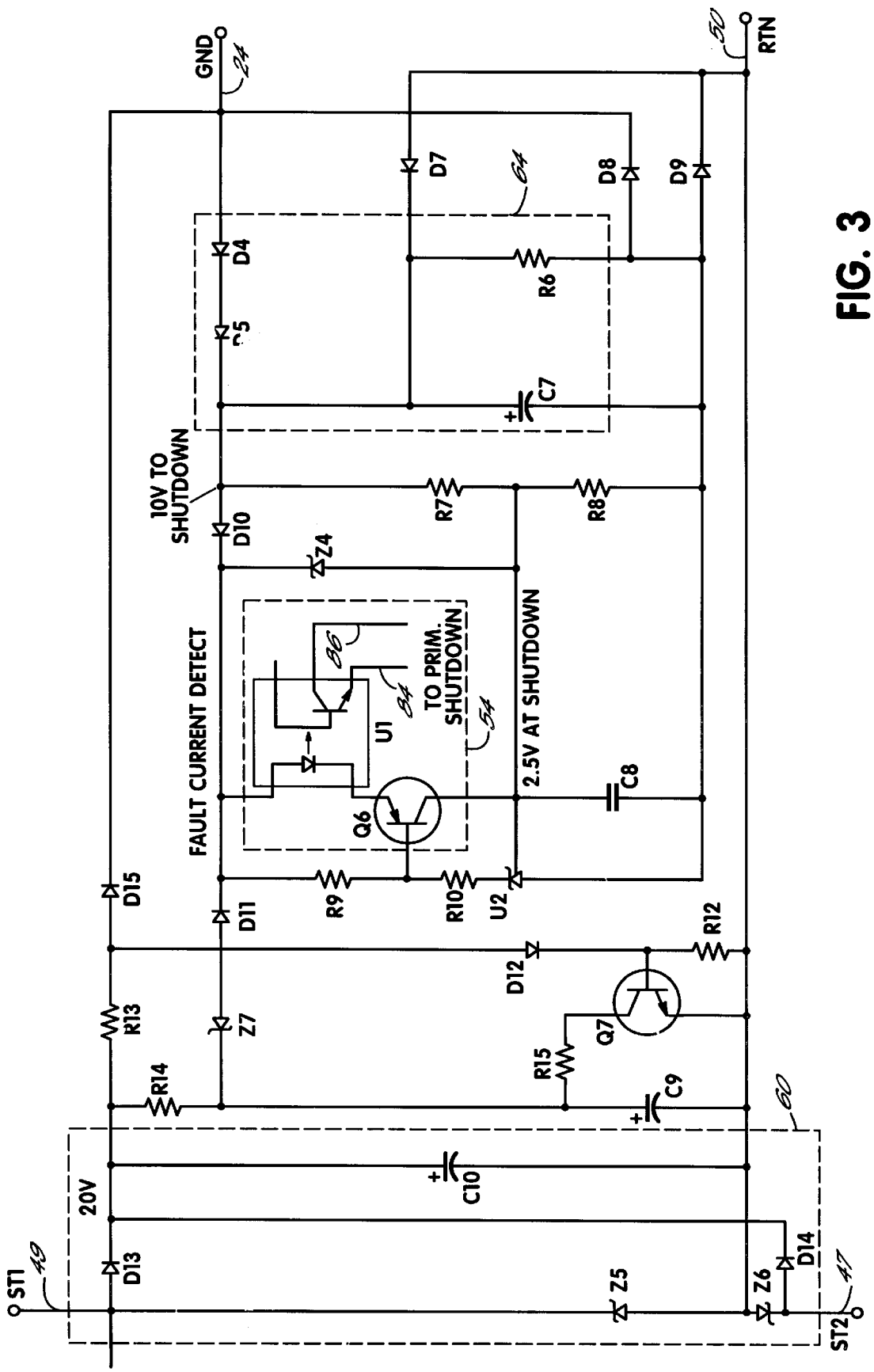
FIG. 3 is a circuit diagram of the ground fault and tamper detection portion of the circuit of FIG. 1, illustrating the circuitry for detecting ground fault current and detecting whether the return terminal has been shorted to the ground terminal.

The latch circuit 82 may also be activated by a SHUT DOWN signal from the secondary circuit illustrated in FIG. 3. Specifically, the collector and emitter of an optotransistor isolator U1 (FIG. 3) are connected to leads 86 and 84. When the optotransistor is turned on, this causes current to flow through resistor R18 and into lead 86 to lead 84. This current flow through resistor R18 activates latch circuit 82 as discussed above and causes transistor Q1 to switch off, opening relay contact 40. Thus, a SHUT DOWN signal from the secondary circuitry shown in FIG. 3 can also activate latch circuit 82 in the same manner as a current through impedance circuit 74.

Referring now to FIG. 3, the tamper detection circuit at the secondary side of the transformer can be explained. As noted above, power for the tamper detection circuit is provided by a power circuit 60 connected between the start terminals 47 and 49 connected to secondary windings 42 and 44. As can be seen in FIG. 1, when secondary windings 42 and 44 are connected to a neon sign 30, alternating current flows through neon sign 30 and windings 42 and 44 and between the start terminals 47 and 49. Power circuit 60 diverts a portion of this current into a storage capacitor C10 to thereby generate a DC voltage for powering the tamper detection circuitry.

Power circuitry 60 includes a rectifier circuit formed of rectifiers D13 and D14 and zener diodes Z5 and Z6. The anode of rectifier D13 is connected to terminal 49 and the cathode of rectifier D13 is connected to the positive terminal of capacitor C10. Similarly, the anode of the rectifier D14 is connected to terminal 47 and the cathode of rectifier D14 is connected to the positive terminal of capacitor C10. The cathode of zener diode Z5 is connected to terminal 49 and the anode of zener diode Z5 is connected to return terminal 50. Similarly, the cathode of zener diode Z6 is connected to terminal 47 and the anode of zener diode Z6 is connected to terminal 47 and the anode of zener diode Z6 is connected to the return terminal 50. The negative terminal of capacitor C10 is also connected to return terminal 50.

These connections form a rectifier that operates as follows: During the positive half cycle of the AC current applied to the sign by secondary windings 42 and 44, current flows into terminal 49, through rectifier D13, through capacitor C10, through zener diode Z6 (anode to cathode), and into terminal 47. Current flow continues in this direction until a charge accumulates across capacitor C10 to produce a voltage of approximately twenty Volts. Once a sufficient charge accumulates across capacitor C10, twenty volt zener diode Z5 breaks over. Thereafter, current flow from secondary terminal 49 flows through zener diode Z5 (cathode to anode), through zener diode Z6 (anode to cathode), and out secondary terminal 47. During the negative half cycle of the AC signal applied to the sign, current flows into secondary terminal 47, through rectifier D14, into capacitor C10, through zener diode Z5 (anode to cathode), and out secondary terminal 49. However, when the voltage across capacitor C10 reaches approximately twenty Volts, this voltage, which is applied across zener diode Z6, causes zener diode Z6 to break over and, at this point, current flows from terminal 47 through zener diode Z6 (cathode to anode), through zener diode Z5 (anode to cathode), and out terminal 49.

Thus, current flow between terminals 47 and 49 is diverted through capacitor C10 until a voltage of twenty Volts is accumulated across capacitor C10. The charge accumulating on capacitor C10 is sufficient to power the remaining circuitry illustrated on FIG. 3.

The insertion of power circuit 60 between secondary winding 42 and secondary winding 44 reduces the effective open circuit voltage appearing across the neon sign, by approximately 40 Volts peak to peak. This minor reduction in voltage across neon sign 30 is inconsequential compared to the several thousands of Volts produced by secondary winding 42 and 44 according to the turns ratio of transformer 14. Accordingly, power circuit 60 does not adversely impact the operation of neon sign 30.

As illustrated in FIG. 3, the positive terminal of capacitor C10 is connected through a resistor R13 to the anodes of rectifiers D12 and D15. The cathode of rectifier D12 is connected to the base of transistor Q7. The emitter of transistor Q7 is connected to return terminal 50. Further, a resistor R12 is connected between the base of transistor Q7 and return terminal 50. The cathode of rectifier D15 is connected to the safety ground input terminal 24. Safety ground input terminal 24 is further connected to an impedance circuit 64, comprised of rectifiers D4 and D5, and capacitor C7 in parallel with a resistor R6. Safety ground input terminal 24 is connected to the anode of rectifier D4. The cathode of rectifier D4 is connected to the anode of rectifier D5. The cathode of rectifier D5 is connected to terminals of capacitor C7 and resistor R6. The opposite terminals of capacitor C7 and resistor R6 are connected to an anode of a rectifier D9, and the cathode of rectifier D9 is connected to return terminal 50. Resistors R7 and R8 are connected between the cathode of rectifier of D5 and anode of rectifier D9.

As a result of these connections, a bias current flows from capacitor C10 through resistor R13, rectifier D12, resistor R12 and the base-emitter junction of transistor Q7. When transistor Q7 is turned on, the anodes of rectifiers D12 and D15 are at a voltage of approximately two diode drops above the voltage of return terminal 50. The path from the anode of rectifier D15, through rectifiers D15, D4 and D5, capacitor C7 and resistor R6, and rectifier D9 to return terminal 50, includes four diodes; therefore, normally, there is insufficient forward voltage to turn rectifiers D15, D4, D5 and D9 on, so normally very little current flows through this path. Thus, normally, very little DC voltage appears across capacitor C7 and resistor R6, and very little current flows through resistors R7 and R8.

As noted above, an isolator circuit 54 including an optotransistor isolator U1 is used to transmit tamper detection and shut down signals from the circuitry of FIG. 3 to the circuitry of FIG. 2 via leads 84 and 86. An optodiode in optotransistor isolator U1 has an anode connected via rectifier D11 and zener Z7 and resistor R14 to the 20 Volt power supply at capacitor C10. The cathode of the optodiode in optotransistor isolator U1 is connected to the emitter of transistor Q6. The collector of transistor Q6 is connected to the node between resistors R7 and R8. The collector of transistor Q6 is further connected to the control terminal of a shunt regulator U2 and one terminal of capacitor C8. The anode of shunt regulator U2 is connected to anode of rectifier D9, and the opposite terminal of capacitor C8. The cathode of shunt regulator U2 is connected via resistors R9 and R10 to the cathode of rectifier D11. The base of transistor Q6 is connected between resistors R9 and R10.

The cathode of zener Z7 is connected to resistor R14 and to resistor R15. The opposite terminal of resistor R15 is connected to the collector of transistor Q7. Capacitor C9 is connected between the cathode of zener Z7 and return terminal 50.

In use, as a result of the above connections, so long as the above described bias current is flowing through resistor R13, through rectifier D12 and through the base-emitter junction of transistor Q7, transistor Q7 will turn on. When transistor Q7 is turned on, capacitor C9 is substantially discharged through transistor Q7 and resistor R15 (resistor R15 limits the peak discharge current). In such circumstances, the voltage across capacitor C9 is insufficient to break over zener diode Z7, thus preventing current flow through zener diode Z7 and rectifier D11 and to the anode of the optodiode in optotransistor isolator U1.

If there is any significant fault current from the sign to earth ground, during alternate half cycles, the fault current returning from ground terminal 24 drives the return terminal 50 positive with respect to the safety ground terminal 24. Under these circumstances, diode D15 becomes forward biased forcing the DC bias current formerly flowing through resistor R13 to be diverted into the safety ground terminal 24. As a result, rectifier D12 fails to deliver current to resistor R12 and the base of transistor Q7, causing transistor Q7 to turn off. Once transistor Q7 turns off, capacitor C9 begins charging through resistor R14. However, capacitor C9 and resistor R14 have a time constant significantly longer than one half cycle at the line frequency. As a result, before capacitor C9 can charge to a substantial voltage, the next half cycle of the line frequency drives the return terminal 50 negative with respect to the safety ground terminal 24, at which time (for reasons explored above) rectifier D12 turns on, current again flows through resistor R12 and the base-emitter junction of transistor Q7. Transistor Q7 then turns on, and discharges capacitor C9. Thus, even in the presence of ground fault current, capacitor C9 will remain substantially discharged, and no substantial current will flow through zener diode Z7 into the anode of the optodiode in optotransistor isolator U1.

However, the operation of the circuit is substantially different when a short is formed between the safety ground terminal 24 and the return terminal 50. In this situation, current flowing through resistor R13 is diverted through rectifier D15, through the short and to the return terminal 50. Under these circumstances, rectifier D12 remains turned off at all times, and substantially no current flows through rectifier D12 into the base of transistor Q7, or into resistor R12. Thus, transistor Q7 turns off and capacitor C9 charges toward the 20 Volt voltage of capacitor C10.

When the voltage of capacitor C9 charges to a sufficient level, zener diode Z7 breaks over, and current flows through zener diode Z7 and rectifier D11. This current flows causes zener Z4 to break over and permit current to flow into capacitor C8 and through resistor R8. This current flow charges capacitor C8 until it reaches a voltage of approximately 2½ volts, at which time shunt regulator U2 is turned on, drawing current directly through resistor R10, resistor R9, the emitter-base junction of transistor Q6 and the optodiode of optotransistor isolator U1. Once current flows through the optodiode of optotransistor isolator U1, light is generated by the optodiode, stimulating carriers in the base of the associated optotransistor, turning the optotransistor on and drawing current from lead 86 to lead 84. This current from lead 86 to lead 84 then activates the latch circuit 83 illustrated in FIG. 2, disconnecting power from the transformer 14.

Thus, if there is a short between earth ground 24 and return terminal 50, this short will divert the bias current produced by the circuitry of FIG. 3, causing a current to be delivered between terminals 84 and 86, causing power to be disconnected form the transformer primary winding 36.

The circuitry of FIG. 3 further includes a rectifying arrangement for detecting substantial ground fault current between the earth ground terminal 24 and the circuit node connected to return terminal 50. As discussed above, current returning to the lamp from ground will flow from terminal 24, through this rectifying arrangement, through the node connected to terminal 50, through rectifier 60, and then to the secondary windings and the lamp via secondary start terminal 47 or secondary start terminal 49.

To form this rectifying arrangement, as noted above, the safety ground terminal 24 is connected via rectifiers D4 and D5 to resistor R7 and the terminals of capacitor C7 and resistor R6, permitting current flow from safety ground terminal 24 to resistor R7 and the first terminals of capacitor C7 and resistor R6. Also, resistor R8 and the opposite terminals of capacitor C7 and resistor R6 are connected via rectifier D9 to the circuit node connected to return terminal 50, permitting current flow from resistor R8 and the opposite terminals of capacitor C7 and resistor R6 to the circuit node connected to return terminal 50. In addition, resistor R7 and the first terminals of capacitor C7 and resistor R6 are connected via rectifier D7 to the circuit node connected to return terminal 50, permitting current flow from the circuit node connected to return terminal 50 to resistor R7 and the first terminals of capacitor C7 and resistor R6. Furthermore, resistor R8 and the opposite terminals of capacitor C7 and resistor R6 are connected via rectifier D8 to safety ground terminal 24, permitting current flow from resistor R8 and the opposite terminals of capacitor C7 and resistor R6 to the safety ground terminals. Moreover, a rectifier D10 is connected between the cathode of zener diode Z4 and the cathode of rectifier D5.

As a result of these connections, any significant ground fault current flowing between the circuit node connected to return terminal 50 and safety ground terminal 24 will be rectified and passed through capacitor C7 and resistor R6. Specifically, during the positive half cycle, current from the circuit node connected to return terminal 50 will flow through rectifier D7, resistors R7 and R8, capacitor C7 and resistor R8, and rectifier D8 to safety ground terminal 24. During the negative half cycle, current will flow through rectifiers D4 and D5, through resistors R7 and R8, capacitor C7 and resistor R8, and through rectifier D9 to the circuit node connected to return terminal 50. Thus, a full wave rectified current will flow through resistors R7 and R8, capacitor C7 and resistor R8, representative of any ground fault current flowing between the circuit node connected to return terminal 50 and earth ground. Capacitor C7 connected in parallel with resistor R6 and the series combination of resistors R7 and R8, form a filter circuit. This circuit will filter the AC components of the full-wave rectified ground fault current, to produce a DC voltage representative of the average magnitude of the ground fault current. If the ground fault current is sufficient to generate an average voltage of 2½ Volts across resistor R8, capacitor C8 will charge until it reaches the 2½ Volt threshold which activates shunt regulator U2. As noted above, when shunt regulator U2 turns on, current is drawn through the optodiode in optotransistor isolator U1, sending a SHUT DOWN signal to the primary circuitry shown in FIG. 2 in the manner discussed above.

Thus, when a substantial ground fault current flows between safety ground terminal 24 and the circuit node connected to return terminal 50, this ground fault current will be detected and will cause power to be disconnected from primary winding 36 of transformer 14.

The following table summarizes, for one embodiment of the present invention, the values of various components discussed above and illustrated in the figures:

| | |
|---|---|
| R2 | 10 KΩ ¼ W |
| R3, 4, 10 | 1 KΩ ¼ W |
| R5 | 470 KΩ ¼ W |
| R6 | 931 Ω ¼ W |
| R7 | 7.50 KΩ ¼ W |
| R8 | 2.49 KΩ ¼ W |
| R9, 18 | 3.3 KΩ ¼ W |
| C1 (120V Standard) | .47 µF 250V UL RECOG X |
| C1 (277V Standard) | .22 µF 300V UL RECOG X |
| C2 | 47 µF 63V ELECTROLYTIC |
| C4 | .22 µF 50V ELECTROLYTIC |
| C5, 6 | .0022 µF 250/400 VAC ceramic Y UL RECOG |
| C7 | 47 µF 25V ELECTROLYTIC |
| C8 | .01 µF 50V CER MONO |
| C11, 12 | 3.3 µF 50V ELECTROLYTIC |
| C14 | .033 µF 100V CER MONO |
| D1 | 1A 200V DIODE |
| D2–4, 7–9 | .15A 75V DIODE |
| Z1 | 51V TRANSORB 600 W |
| Z3 | 9.1V ½ W ZENER |
| Q1 | NPN 80V .5A TO −92 |
| Q3, 6 | PNP 40V .6A |
| Q4 | NPN 40V .6A |
| U1 | OPTO COUPLER UL RECOG |
| U2, 3 | IC REFERENCE |
| K1 | 48VDC 10A @ 120V 6A @ 277 FORM A UL RECOG |
| R11, 13, 19 | 24 KΩ ¼ W |
| R12 | 10 KΩ ¼ W |
| R14 | 1.2 KΩ 1 W |
| R15 | 22 Ω ¼ W |
| C9, 10 | 47 µF 25V ELECTROLYTIC |
| D5, 10, 12–14 | .15A 75V DIODE |
| D11 | 1A 200V DIODE |
| D15 | 130V ½ W ZENER |
| Z4 | 9.1V ½ W ZENER |
| Z5, 6 | 20V 1 W ZENER |
| Z7 | 3.3V ½ W ZENER |
| Q2 | FET 150V, 0.1A |
| Q7 | NPN 40V, .6A |

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, the circuitry described above could be used in one-end ground applications, i.e., with a transformer having a single secondary winding, and a lamp lacking any mid-point return. In such a circumstance, the first terminal of the single secondary winding is connected to a first end of the lamp. The second terminal of the secondary winding is connected to start terminal 49. The second end of the lamp is connected to terminal 50. Connected in this manner, power circuit 60 illustrated in FIG. 3 forms a half-wave bridge, rectifying a small portion of the current through the secondary winding to supply power for tamper detection; secondary start terminal 47, zener diode Z6 and rectifier D14 are not used, and may be eliminated if desired. Otherwise, the circuitry of FIG. 3 works in the manner described above.

In a further alternative embodiment, a simplified circuit may be provided for use in low-cost applications, where the lamp will not have a mid-point return. In these applications, the external connection to return terminal 50 may be removed, thus eliminating the temptation to tamper with this terminal. In such circumstances, the return terminal could not be connected to ground; as a result, there is no need for the rectification and tamper detection circuitry shown in FIG. 3. Thus, the circuitry connected to the secondary can be substantially simplified.

Figure 3A:
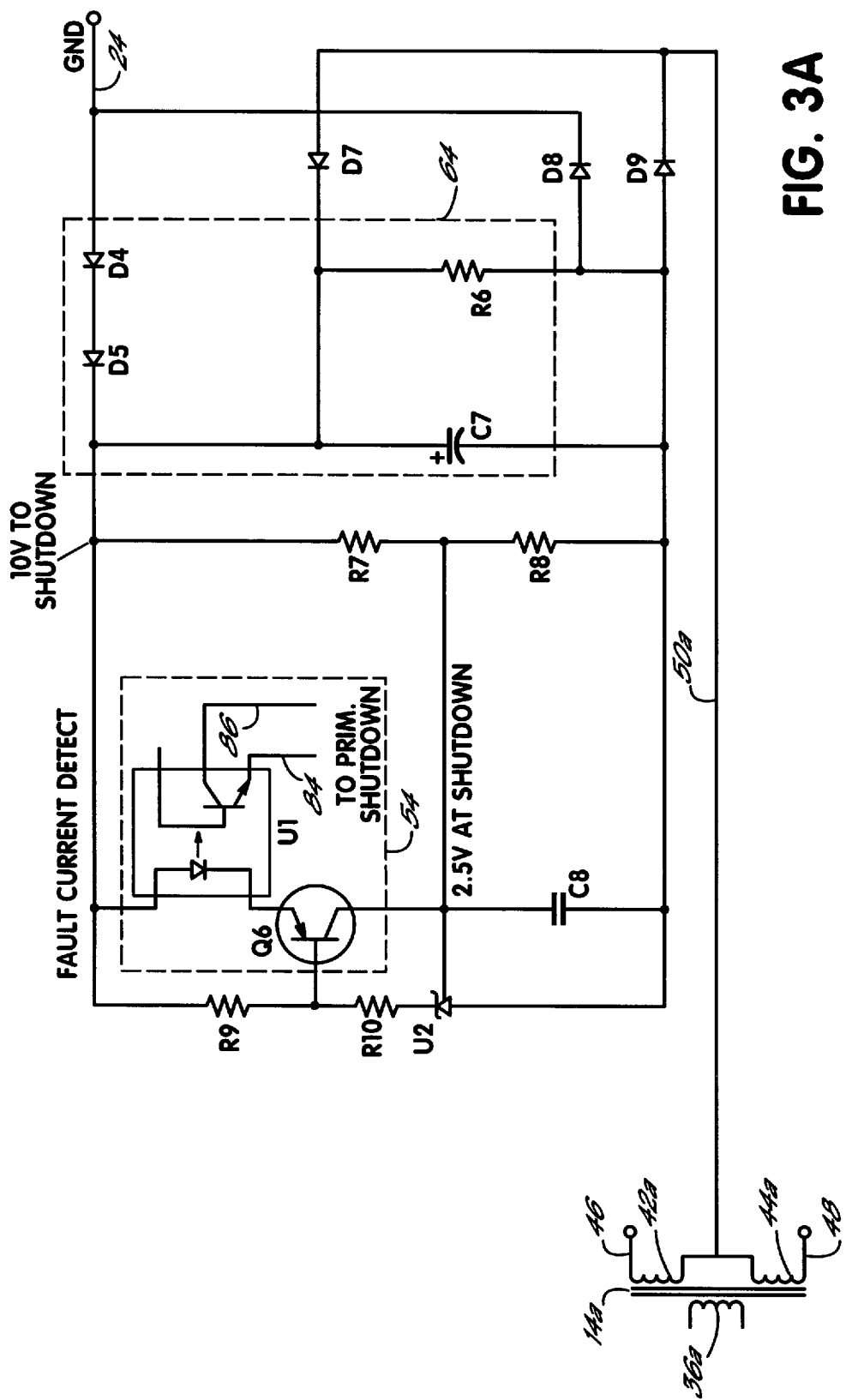
FIG. 3A is a circuit diagram of a simplified version of the circuit of FIG. 3, used in applications where a return terminal and the associated tamper detection circuitry are not needed.

Referring now to FIG. 3A, in this embodiment, the transformer 14*a* has a different secondary structure.

Specifically, the first and second windings 42a and 44a are connected together to form a single winding with a center tap. A line 50a connected to this center tap connects to the circuit of FIG. 3A in place of the return terminal 50 illustrated in FIG. 3. As a result, any fault current returning from ground terminal 24 to the lamp via terminals 46 and 48, must flow through the center tap terminal 50a and impedance 64.

The circuit illustrated in FIG. 3A includes the rectification circuit formed, as described above, by rectifiers D4, D5, D7, D8 and D9, so that ground fault current returning to the lamp is forced to flow through resistors R7 and R8, and capacitor C7 and resistor R6. As in FIG. 3, if this current develops a voltage of approximately 10 volts across capacitor C7, shunt regulator U2 turns on, drawing current through the optodiode in optotransistor isolator U1, delivering a SHUT DOWN signal to the circuitry of FIG. 2.

The circuitry shown in FIG. 3A lacks the power and tamper detection circuitry shown in FIG. 3. Specifically, zener diodes Z5 and Z6, rectifiers D13, D14 and capacitor C10 forming power circuit 60 have been removed, since there is no need to generate rectified power for tamper detection. Furthermore, resistors R12, R13, R14, R15, capacitor C9, zener diodes Z4 and Z7, rectifiers D10, D11, D12 and D15 and transistor Q7, which are used as noted above to detect a short circuit between the ground and return terminals, are eliminated in the circuitry shown in FIG. 3A, as the circuitry shown in FIG. 3A does not include a return terminal.

In another alternative embodiment, as noted above, tamper detection might be performed by using rectified electrical energy in capacitor C10 (FIG. 3) to produce a DC current between the ground and return terminals through impedance 64. The tamper detection circuitry could then detect the voltage appearing between the ground and return terminals. If less than a predetermined threshold voltage appeared between the ground and return terminals, this would indicate a short between the ground and return terminals, and the tamper detection circuitry would respond by causing power to be removed from the primary winding.

The invention in its broader aspects is therefore not limited to the specific details, representative examples and embodiments described above. Accordingly, departures may be made from such details without departing from the spirit or scope of applicant's general inventive concept.

What is claimed is:

1. A protected circuit for connection to a primary winding of a transformer, for detecting reverse wiring or failure to connect a ground terminal, said circuit comprising:

a ground terminal, line and neutral terminals for connection to a source of alternating current power, first and second winding terminals for connection to said primary winding to supply alternating current electrical power thereto, power application circuitry for connecting said line terminal and said neutral terminal to said first and second winding terminals, respectively, said power application circuitry being responsive to a shutoff signal to disconnect at least one of said line or neutral terminals from said first or second winding terminal, a first electrical impedance connected between said line terminal and said ground terminal, a second electrical impedance connected between said ground terminal and said neutral terminal, and ground detection circuitry electrically coupled to said second electrical impedance, and generating said shutoff signal upon detection of more than a predetermined current flow through said second electrical impedance.

2. The circuit of claim 1 wherein said power application circuitry is an electrical switch.

3. The circuit of claim 1 wherein said power application circuitry comprises:

a relay comprising a movable contact for forming a connection between said line terminal and said first winding terminal, and a drive coil magnetically coupled to said movable contact for movement thereof, a rectifying circuit connected between said line and neutral terminals for generating a rectified monopolar voltage on a relay drive terminal relative to said neutral terminal, a first terminal of said drive coil being connected to said relay drive terminal, a switch having a control terminal, a first signal terminal connected to a second terminal of said drive coil, and a second signal terminal connected to said neutral terminal, for providing an electrical connection between said first and second signal terminals in response to an electrical signal at said control terminal, said shutoff signal being coupled to said control terminal of said switch.

4. The circuit of claim 3 wherein said ground detection circuitry comprises latch circuitry having a latch terminal and a trigger terminal, said latch circuitry producing a constant low impedance between said latch terminal and said neutral terminal upon detection of a trigger signal at said trigger terminal, said shutoff signal being coupled to said trigger terminal, and said latch terminal is electrically coupled to said control terminal of said switch for continuously providing said shutoff signal to said switch upon detection of more than a predetermined threshold voltage between said ground and neutral terminals.

5. The circuit of claim 1 wherein said first electrical impedance comprises a capacitor.

6. The circuit of claim 1 wherein said second electrical impedance comprises capacitors and resistors.

7. The circuit of claim 6 wherein said first electrical impedance comprises a capacitor.

8. A tamper protected circuit for connection to a primary winding and a secondary winding of a transformer, each of said windings comprising first and second terminals for carrying a current therethrough, said circuit comprising:

power application circuitry having terminals for connection to said first and second terminals of said primary winding to supply alternating current electrical power thereto, said power application circuitry being responsive to a shutoff signal to reduce electrical power applied to said first and second terminals of said primary winding, rectification circuitry having a first start terminal for connection to a first terminal of said secondary winding, and a return terminal for connection to a second terminal of a load, a first terminal of said load being connected to a second terminal of said secondary winding, such that current flow through said load and said secondary winding passes between said first start terminal and said return terminal, said rectification circuitry rectifying at least a portion of a current flowing between said first start terminal and said return terminal, a ground terminal, an electrical impedance connected between said ground terminal and said return terminal, said rectification circuitry being connected to said ground and return terminals and applying an electrical signal across said electrical impedance, tamper detection circuitry connected to said ground and return terminals, and generating said shutoff signal upon detection of a predetermined electrical signal across said electrical impedance.

9. The circuit of claim 8 wherein said rectification circuitry comprises a capacitor, a first rectifier connected between said first start terminal and a first terminal of said capacitor, to permit only forward current flow from said first start terminal to said first terminal of said capacitor, a first zener rectifier connected between said first start terminal and said return terminal, to permit forward current flow from said return terminal to said first start terminal, and to permit reverse current flow from said first start terminal to said return terminal only when a predetermined voltage appears between said first start terminal and said return terminal.

10. The circuit of claim 8 further comprising a ground fault detection circuit comprising rectification circuitry connecting said ground and return terminals to said electrical impedance, said rectification circuitry rectifying at least a portion of a ground fault current flowing between said ground and return terminals into a direct current flowing through said electrical impedance, and ground fault detection circuitry connected to said electrical impedance, and generating said shutoff signal upon detection of more than a predetermined threshold voltage across said electrical impedance.

11. The circuit of claim 10 wherein said electrical impedance comprises an electrical resistance.

12. The circuit of claim 9 configured for use with a transformer having first and second secondary windings, and a load which is a lamp having first, second and third terminals, said second terminal being located at an electrical midpoint of said lamp, wherein said rectification circuitry further comprises a second start terminal for connection to a first terminal of said second secondary winding, a third terminal of said lamp being connected to a second terminal of said second secondary winding, such that current flow through said lamp and said second secondary winding passes between said second start terminal and said return terminal, a second rectifier connected between said second start terminal and said first terminal of said capacitor, to permit only forward current flow from said second start terminal to said first terminal of said capacitor, a second zener rectifier connected between said second start terminal and said return terminal to permit forward current flow from said return terminal to said second start terminal, and to permit reverse current flow from said second start terminal to said return terminal only when a predetermined voltage appears between said second start terminal and said return terminal.

13. The circuit of claim 8 wherein said power application circuitry comprises line and neutral terminals for connection to a source of electrical power, said neutral terminal being connected to said second terminal of said primary winding, and an electrical switch connected between said one of said line and neutral terminals and said first terminal of said primary winding, said power application circuitry being responsive to said shutoff signal to cause said switch to disconnect said line or neutral terminal from said first terminal of said primary winding upon receipt of said shutoff signal.

14. The circuit of claim 13 wherein said electrical switch comprises a relay comprising a movable contact connected between said line or neutral terminal and said first terminal of said primary winding, and a drive coil magnetically coupled to said movable contact for movement thereof, and said power application circuitry comprises:

a rectifying circuit connected between said line and neutral terminals for generating a rectified monopolar voltage on a relay drive terminal relative to said neutral terminal, a first terminal of said drive coil being connected to said relay drive terminal, and a relay control switch having a control terminal, a first signal terminal connected to a second terminal of said drive coil, and a second signal terminal connected to said neutral terminal, for providing an electrical connection between said first and second signal terminals in response to an electrical signal at said control terminal, said shutoff signal being coupled to said control terminal of said relay control switch.

15. The circuit of claim 14 wherein said power application circuitry comprises latch circuitry connected to said neutral terminal and having a latch terminal and a trigger terminal, said latch circuitry producing a constant low impedance between said latch terminal and said neutral terminal upon detection of a trigger signal at said trigger terminal, and further comprising an isolation circuit coupled between said tamper detection circuitry and said trigger signal for delivering said shutoff signal to said trigger terminal of said latch circuitry upon detection of less than a predetermined threshold voltage across said electrical impedance, and wherein said latch terminal is electrically coupled to said control terminal of said relay control switch for continuously providing said shutoff signal to said relay control switch upon triggering of said latch circuit.

16. An electrical energy collector for collecting electrical energy from a current flow between first and second secondary windings of a transformer, comprising:

a first start terminal, a second start terminal, a capacitor having first and second terminals, a first rectifier connected between said first start terminal and said first terminal of said capacitor to permit only forward current flow from said first start terminal to said first terminal of said capacitor, a second rectifier connected between said second start terminal and said first terminal of said capacitor to permit only forward current flow from said second start terminal to said first terminal of said capacitor, a first zener rectifier connected between said first start terminal and said second terminal of said capacitor to permit forward current flow from said second terminal of said capacitor to said first start terminal, and to permit reverse current flow from said first start terminal to said second terminal of said capacitor only when a predetermined voltage appears between said first start terminal and said second terminal of said capacitor, and a second zener rectifier connected between said second start terminal and said second terminal of said capacitor to permit forward current flow from said second terminal of said capacitor to said second start terminal, and to permit reverse current flow from said second start terminal to said second terminal of said capacitor only when a predetermined voltage appears between said second start terminal and said second terminal of said capacitor, whereby said rectifiers divert current flow between said start terminals into said capacitor to accumulate a charge upon said capacitor.

* * * * *

UNITED STATES PATENT AND TRADEMARK OFFICE
CERTIFICATE OF CORRECTION

PATENT NO. : 5,847,909
DATED : December 8, 1998
INVENTOR(S) : Hopkins et al.

It is certified that error appears in the above-identified patent and that said Letters Patent is hereby corrected as shown below:

Column 7, line 17, after "connected", insert --to--.

Column 8, line 12, delete "and".

Column 8, line 12, delete "thought", insert --through--.

Column 9, line 47, delete "be".

Column 12, line 41, delete "flows", insert --flow--.

Signed and Sealed this

Thirteenth Day of July, 1999

Attest:

Attesting Officer

Q. TODD DICKINSON

Acting Commissioner of Patents and Trademarks